March 19, 1963   B. C. HUDGENS ET AL   3,081,644
CLOSE TOLERANCE ANTI-FRICTION COMPONENT ASSEMBLY
Filed Oct. 5, 1959   2 Sheets-Sheet 2
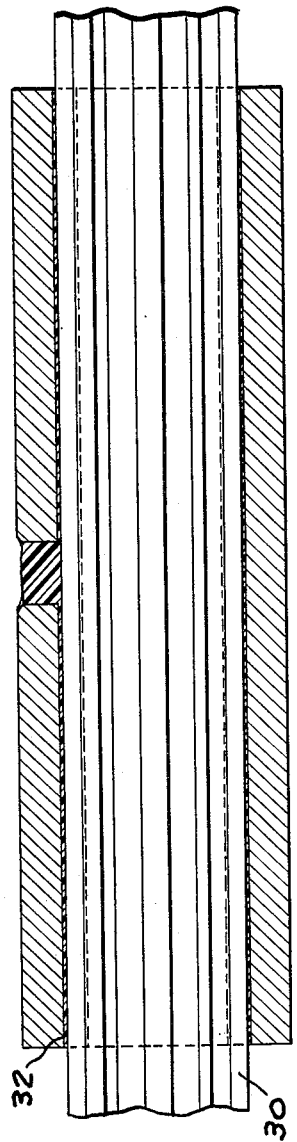
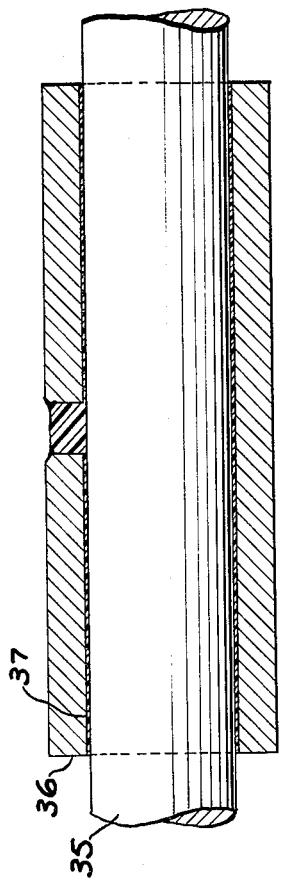
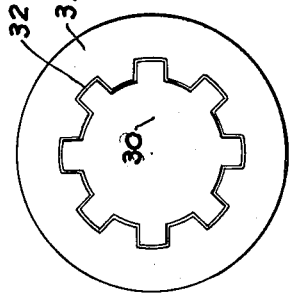
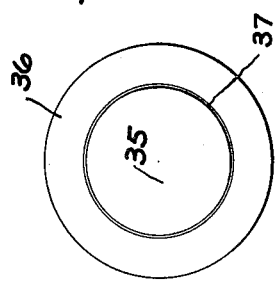
INVENTORS
BERNARD C. HUDGENS, CHARLES F. HAMMOND
& RALPH P. KOHLITZ
BY
Barnes, Kisselle, Raisch & Choate
ATTORNEYS 3,081,644
CLOSE TOLERANCE ANTI-FRICTION
COMPONENT ASSEMBLY
Bernard C. Hudgens, West Lafayette, Ind., and Charles F. Hammond, Detroit, and Ralph P. Kohlitz, St. Clair Shores, Mich., assignors to Gemmer Manufacturing Company, Division of Ross Gear and Tool Company, Incorporated, Lafayette, Ind., a corporation of Indiana
Filed Oct. 5, 1959, Ser. No. 844,419
34 Claims. (Cl. 74—424.8)

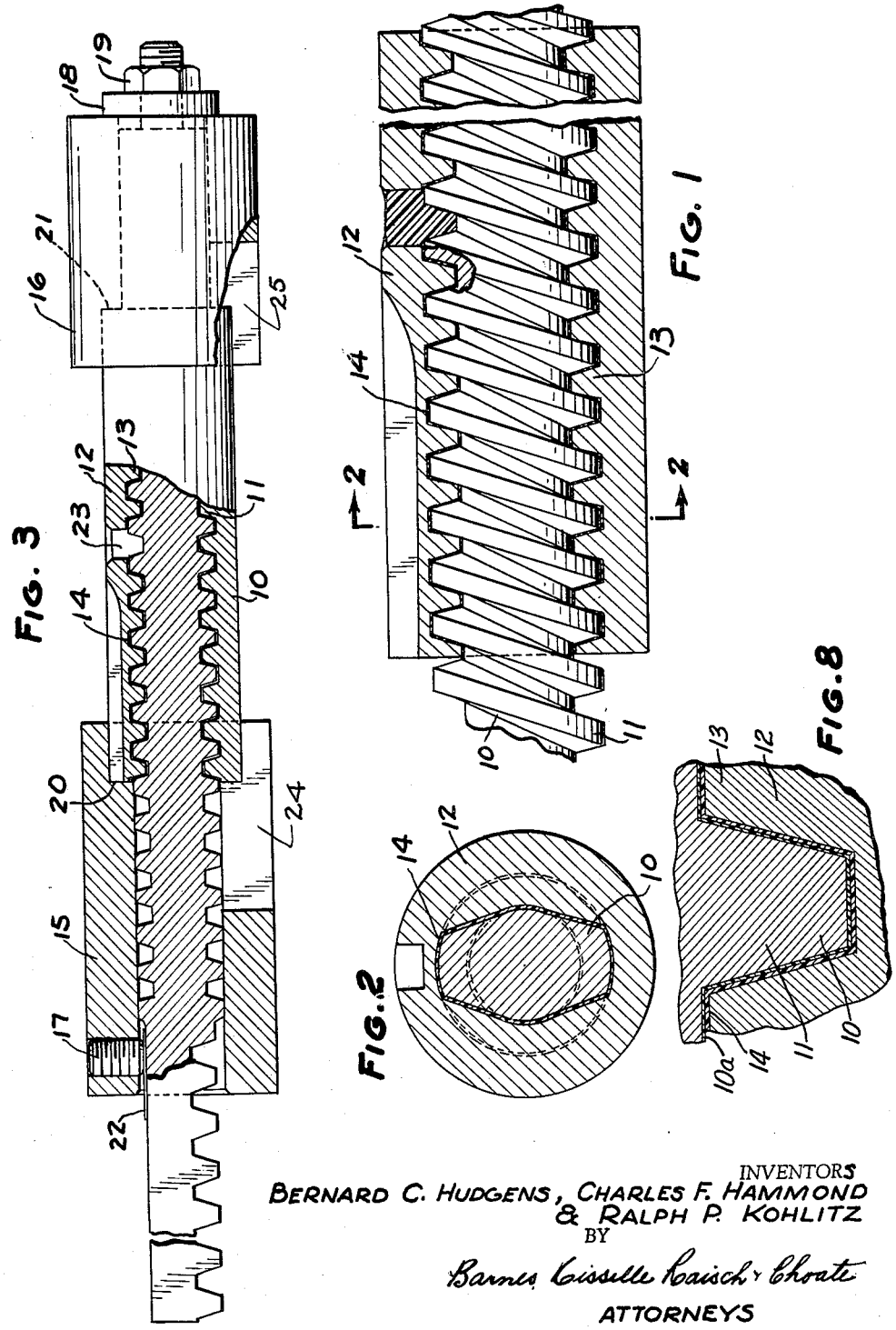

This invention relates to a mechanical assembly comprising two components one of which is movable relative to the other, which assembly has close tolerances and low friction between the components.

In various mechanical applications it is necessary for one component or member to operate within another at close tolerance. For example, such an assembly may comprise a worm and a nut threaded in the worm. In order to prevent backlash in such an assembly, it is necessary to form the components precisely and accurately to close tolerances. This is not only an expensive and costly procedure but, in addition, often results in high friction between the components of the assembly. Similar problems of backlash and clearance are found in assemblies which have pure axial movement such as splines or which have pure rotational movement such as shafts and bearings.

It is an object of this invention to provide a two-component assembly which has the necessary close fit of the components to prevent backlash but, at the same time, has minimum friction between the components.

It is a further object of this invention to provide a worm and nut assembly which has the necessary close fit of the components to prevent backlash but, at the same time, has minimum friction between the components.

It is a further object of this invention to provide a novel method of making such a two-component assembly.

It is a further object of this invention to provide such an assembly which can be made at low cost.

It is a further object of this invention to provide such an assembly wherein only one of the components is made with a relatively high degree of accuracy while the other component is made with a lesser degree of accuracy and by less costly methods.

In the drawings:

FIG. 1 is a longitudinal sectional view of a two-component assembly embodying the invention.

FIG. 2 is a sectional view taken along the line 2—2 in FIG. 1.

FIG. 3 is a sectional view of an apparatus for making the unit.

FIG. 4 is a longitudinal sectional view of another type of two-component assembly embodying the invention.

FIG. 5 is an end view of the assembly shown in FIG. 4.

FIG. 6 is a longitudinal sectional view of a still further two-component assembly embodying the invention.

FIG. 7 is an end view of the assembly shown in FIG. 6.

FIG. 8 is a fragmentary sectional view on an enlarged scale of a portion of FIG. 3.

Referring to FIGS. 1 and 2, the invention is shown and described, by way of example, in connection with a two-component assembly of a worm and a nut, such as used in the steering gear for vehicles.

As shown in FIGS. 1 and 2, a worm 10 of metal is provided with an external thread 11 whereby it may be threaded into a nut 12 of metal having an internal thread 13. A film coating 14 of plastic material is bonded to one of the threads, herein shown as being bonded to the thread 13 of the nut 12.

The surface of the thread 11 of the worm 10 is formed with a high degree of dimensional accuracy. In the case of a component such as a worm this high degree of accuracy may be achieved at low cost by the use of high production techniques which are well known. On the other hand, the internal thread 13 in the nut is more difficult and costly to make. According to the invention the internal thread 13 of the nut 12 is made oversize relative to the size of the thread 11 on the worm 10 by processes which result in a much less degree of accuracy than the accuracy of thread 11 on the worm 10, for example, by casting. The plastic film coating 14 on the nut thread 13 fills the space between the thread 13 of the nut 12 and the thread 11 of the worm 10 and thereby locates the nut 12 accurately relative to the worm 10.

The worm and nut assembly is made by coating one of the parts with a release or parting agent, assembling the parts and then injecting plastic material between the threads of the parts after they have been properly assembled.

Referring to FIGS. 3 and 8, the worm 10 which has been previously coated with a release agent 10a is threaded in nut 12 and sleeves 15, 16 are slipped over the ends of the worm 10 and nut 12. A set screw 17 is threaded radially into sleeve 15 and engages worm 10. A washer 18 and nut 19 are threaded on the reduced end of the worm 10.

Sleeves 15, 16 are provided with shoulders 20, 21, respectively, which engage the ends of the nut 12 to position the nut axially and radially relative to the worm. Shoulder 21 on sleeve 16 is first caused to engage one end of the nut 12 by tightening the nut 19. Shoulder 20 on sleeve 15 is then brought into engagement with the other end of the nut 12. Prior to tightening the set screw 17, the nut 12 is rotated back and forth on worm 10 to establish a substantially uniform axial clearance between the teeth 13 of the nut 12 and teeth 11 of the worm 10. The set screw 17 is then tightened. A shim 22 may be provided between the set screw 17 and the worm 10 to prevent damage to the worm 10. Any other suitable apparatus may be used which will position the nut 12 and worm 10 axially and radially relative to one another to provide a substantially uniform helical space between the teeth 11, 13.

By this arrangement the nut 12 and worm 10 are adjusted so that there is a generally uniform helical space between mating surfaces of the teeth. Plastic is then introduced under pressure through a radial opening 23 in the nut 11 and flows under pressure through the helical space between nut 12 and worm 10. Radial relief slots 24, 25 may be provided in sleeves 15, 16, respectively, in order to insure that no air is entrapped between the threads of the form and the nut.

The assembly of the nut and worm is then placed in an oven to cure and set the plastic.

Although the invention is particularly applicable to an assembly wherein it is desired to translate rotary to linear motion or the reverse, such as on a worm and nut assembly used in steering gear, the invention is also applicable to other assemblies wherein one member moves either axially or rotatably in another member under conditions which require close tolerances and low friction. For example, as shown in FIGS. 4 and 5, the invention may be applied to a spline assembly comprising a spline shaft 30 provided for axial movement in a spline collar 31 with a film coating 32 bonded to the teeth of the spline shaft 30. As shown in FIGS. 6 and 7, the invention may be applied to a shaft which is rotatably mounted in a collar or bearing, the shaft 35 being telescopically received in collar bearing 36 and having a film coating 37 of plastic material bonded to the external surface thereof adjacent the interior surface of the collar or bearing 36.

It can be seen that only one of the members need be manufactured to close tolerances, and then only to a uniform dimension throughout its area of contact with the other member. Since each assembly is made so that the two parts thereof match, the dimensions of one assembly need not be the same as that of another. The member on which the plastic film coating is placed in each assembly can be made with a much lesser accuracy than the other member, the only requirement being that it have a dimension such that it is larger or smaller than the other member, depending upon whether it is the outer or inner member.

The plastic material which is bonded to form the film coating should be of the type having good wear resistance, high strength, excellent adhesion to the part to which it is to be bonded, a low coefficient of friction relative to the part not coated, a low degree of cold flow, high heat distortion point beyond the working limits, and controlled low shrinkage during curing.

The assembly should be such that there is a free running fit of the parts. This free running fit may be achieved by either controlling the shrinkage of the film coating 14 or by removing the release or parting agent which is used to prevent bonding of the plastic film coating with one of the surfaces of the two-component assembly as presently described.

Any suitable plastic material having the desired properties may be used. Satisfactory results have been obtained by using epoxy resins mixed with fine mesh graphite, the latter acting as an agent for controlling shrinkage of the epoxy resin. The film coating may also be obtained from epoxy resins having tetrafluoroethylene particles uniformly distributed therethrough. The epoxy resin is, of course, mixed with a hardener or a catalyst according to conventional practice in the use of epoxy resins. Such catalysts vary in the order of activity thereby varying the pot life of the epoxy resins.

The epoxy resin, graphite and catalyst are mixed at room temperature and then injected under pressure to form the plastic film coating after which the assembly including the film coating is heated to cure the plastic. In order to control the shrinkage, the curing is preferably performed in two steps, one at slightly elevated temperatures above room temperature and the second at higher temperatures for a longer period of time.

The members of the assembly should first be thoroughly cleaned in a suitable degreasing agent such as trichloroethylene vapors. The member to which the epoxy resin or other plastic material is not to be applied is then coated with a suitable releasing agent or material. Various such materials may be used, satisfactory results having been achieved by applying a thin film coating of Teflon (tetrafluoroethylene manufactured by DuPont) or silicone. The part to be coated with the releasing agent is preferably dry sand blasted prior to degreasing or cleaning with the degreaser in order to provide more surface area for good bonding of the releasing agent. Any surface oxide removed by the dry sand blasting will be restored on the heating of the parts thereby reproducing the oxide which may be beneficial.

In order to apply the Teflon coating, the part to be coated is preferably rotated at constant speed and the spray nozzle is reciprocated along the length of the part. The rate of deposition is sufficiently slow that a number of passes are required until the desired film thickness is obtained. A film thickness on the order of 0.0005 inch has been found to be satisfactory. After the spraying operation the part is dried in an infra-red oven for approximately 15 seconds or in an air oven for approximately one to two minutes. The temperature and rate of drying is kept sufficiently low to prevent the formation of bubbles on the surface. After the initial drying, the film coating is baked and sintered at a temperature of about 700° F. in an air circulating oven. The initial drying removes the dispersing agent while the second drying at an elevated temperature drives off the wetting agent leaving a sintered Teflon film which is homogeneous. The time required is about three minutes. If thicker coatings are required, successive layers must be passed through the sintering cycle.

It should be understood, of course, that the time and temperatures of drying can be varied, the limiting factors being that a uniform film coating should be produced.

A silicone coating can also be applied by spraying or dipping, preferably by applying a mist spray. After coating, the part should be allowed to air dry until the volatile solvents have evaporated. This may require about one hour when sprayed or about two hours when dipped. This time can be reduced by use of an infra-red oven. The coating is then cured at a proper temperature, for example, two hours at 425° F. or one hour at 450° F. After cooling to room temperature, the parts can be handled easily. The quality of the coating can be judged by a high gloss and smoothness. The hardness can be judged by rubbing a cloth on the surface with a firm pressure. The coating is sufficiently hard and no dulling will occur.

The following examples are illustrative of procedures which have been found to produce satisfactory worm and nut mechanisms:

*Example I*

A worm was manufactured by grinding so that the effective portion of the worm thread had a substantially uniform dimension within plus or minus 0.0005 inch. A nut was then machined with an internal thread which was between 0.020 and 0.040 inch oversize. The worm was then coated with a thin coating of Teflon on the order of 0.0005 inch in thickness.

The latter was achieved by first cleaning and degreasing the worm and immersing in a solvent. The worm was then dried in air and subsequently spray coated with an aqueous dispersion of Teflon. The Teflon used was Teflon 30 made by DuPont and comprising Teflon particles averaging 0.00002 inch in size and including a wetting agent (6% based on dispersed solids).

The worm and nut were then placed in apparatus such as shown in FIG. 3 and the worm was accurately axially and radially aligned relative to the nut so as to produce a substantially uniform clearance between the teeth on the worm and the nut. A graphite filled epoxy compound was then injected through the fill opening in the nut. The compound had the following composition:

Ingredients: Parts by weight
Araldite 6010 _____ 100
Dixon Air Spun Graphite 200–09 _____ 30
Dion hardener RP–22 _____ 15

Araldite 6010 is a liquid epoxy casting resin made by Ciba Company. Dixon Air Sun Graphite 200–09 is a fine mesh powdered graphite made by Dixon Graphite Company. Dion Hardener RP–22 is a liquid hardener for epoxy resin made by Ciba Company.

The entire assembly was then subjected to heat to cure the plastic compound, the curing cycle being as follows:

18 hours at room temperature
2 hours at 212 F.
2 hours at 320° F.

*Example II*

The same procedure was followed as in Example I except that the worm was coated with a silicone coating rather than a Teflon coating. The silicone used was Dow Corning Pan Glaze 620 which is fast curing, chemically resistant resinous coating which withstands temperatures to 500° F. Dow Corning R–671 resin has also given satisfactory results as a releasing agent.

After being cleaned and dried the worm was spray coated with a solution of silicone, known commercially as Dow Corning Pan Glaze, in toluene, the ratio of silicone solution to toluene being 15:85. After being removed from the solution, the worm was placed in an oven and dried for thirty minutes at 120° F. followed by sixty minutes at 475° F.

Worm and nut assemblies made in accordance with the above examples showed excellent low-friction properties without backlash. The tolerances between the parts are much closer than could be achieved by normal forming methods.

The epoxy resin has the required degree of shrinkage so that a free running fit is obtained without backlash. The graphite assists in controlling shrinkage of the epoxy resin. The provision of a Teflon or silicone coating on the surface of the worm not only insures a release and prevents bonding of a plastic to the worm but, in addition, contributes to the low-friction properties of the assembly by providing a surface on the worm which has less friction than the worm material.

The thickness of the film of plastic will depend upon the thickness of the helical space between the members of the worm and nut assembly but may be on the order of 0.020–0.040 inch.

Since the nut is not made to uniform accuracy, the thickness of the coating may vary from one portion to the other of the nut. Although the film is preferably uniform and continuous, it can be appreciated that in some areas the film may be extremely thin due to the non-uniformity of dimension of the nut. We have found that even in those instances the joint has a low friction with minimum backlash.

We claim:

1. An anti-friction assembly comprising a first member and a second member having complementary closely mating surfaces, one said member being movable relative to the other, the mating surface on said first member having a greater dimensional accuracy than the mating surface on said second member whereby a space exists between the mating surfaces of said members, a release agent on the mating surface of said first member and a film coating of substantially homogeneous plastic material adhered directly to the mating surfaces of the second member which has the lesser dimensional accuracy and formed in situ to substantially fill the space between said members, thereby providing a low friction surface adjacent the mating surface of said second member.

2. The combination set forth in claim 1 wherein said plastic material comprises a mixture of epoxy resin and graphite.

3. The combination set forth in claim 1 wherein said plastic material comprises a mixture of epoxy resin and tetrafluoroethylene particles.

4. The combination set forth in claim 1 wherein said release agent on said first member comprises a thin film coating of a material which prevents adherence of said plastic material on said second member with said first member.

5. The combination set forth in claim 4 wherein said release agent on said first member comprises tetrafluoroethylene.

6. The combination set forth in claim 4 wherein said release agent on said first member comprises silicone.

7. An anti-friction assembly comprising a first member and a second member having complementary closely mating surfaces, one said member being movable axially and rotatably relative to the other, the mating surface on said first member having a greater dimensional accuracy than the mating surface on said second member whereby a space exists between the mating surfaces of said members, a release agent on the mating surface of said first member, and a film coating of substantially homogeneous plastic material adhered directly to the mating surfaces of the second member which has the lesser dimensional accuracy and formed in situ to substantially fill the space between said members, thereby providing a low friction surface adjacent the mating surface of said second member.

8. An anti-friction assembly comprising a first member and a second member having closely mating complementary surfaces, said first member being movable axially and rotatably relative to said second member, the mating surface of one said member being greater in dimensional accuracy than the mating surface of the other said member providing a space between said mating surfaces, the dimensional accuracy of said one member being within 20 to 40 thousandths of an inch, a release agent on the mating surface of said first member, and a film coating of substantially homogeneous plastic material adhered directly to one of said mating surfaces only and formed in situ to substantially fill the space between said mating surfaces, said film coating having good wear resistance and low coefficient of friction thereby providing a low friction assembly.

9. An anti-friction assembly comprising a nut having internal threads therein, a screw having external threads thereon threaded into and closely mating the threads of said nut, the dimensional accuracy of one of said nut and screw being greater than the dimensional accuracy of the other of said nut and screw providing a space between the threads, a release agent on said one of said nut or screw which has the greater dimensional accuracy and a film coating of substantially homogeneous plastic material adhered directly to said one of said nut and screw which has a lesser dimensional accuracy and formed in situ to substantially fill the space between said threads thereby providing a low friction bearing surface with the thread of the other of said nut and screw.

10. An anti-friction assembly comprising a nut having internal threads and a screw having external threads complementary to and closely mating said internal threads of said nut, the dimensional accuracy of the threads on said nut being less than the dimensional accuracy of the threads on said screw thereby providing a space between the threads, a release agent on said threads on said screw, and a film coating of substantially homogeneous plastic material adhered directly to the threads on said nut and formed in situ to entirely fill the space between the threads on said nut and the threads on said screw, said material having good wear resistance, high strength, and low friction properties.

11. The combination set forth in claim 10 wherein said release agent on said threads on said screw comprise a thin film coating of release agent which prevents adhesion of said plastic material on said nut to said screw.

12. The combination set forth in claim 10 wherein the threads on said nut are made within tolerances of 0.020 to 0.040 inch.

13. The method of making an anti-friction assembly comprising a pair of parts having complementary mating surfaces which engage to provide relative movement between said parts which comprises making one of said parts with a relatively high degree of accuracy, making the mating surface of the other said part with a lesser degree of accuracy providing a space of generally uniform thickness between the mating surfaces of said parts, providing a surface on the mating surface of one of said parts which prevents adhesion of a plastic material thereto, bringing the mating surfaces of said parts into complementary engaging relationship, positioning one of said parts relative to the other so that the space between the mating surfaces is generally divided radially and axially to provide an annular space of generally uniform thickness between the mating surfaces of said parts, injecting a plastic material of the type which will adhere directly to the other of said parts into said space to substantially fill the space between the mating surfaces of said parts, and curing said plastic material to provide a permanent film coating on said other said part.

14. The method set forth in claim 13 wherein said second part is made with an accuracy of 0.020 to 0.040 inch.

15. The method set forth in claim 13 wherein said plastic material comprises epoxy resin.

16. The method set forth in claim 13 wherein said plastic material comprises epoxy resin and graphite.

17. The method set forth in claim 13 wherein said step of providing a surface on one of said parts which prevents adhesion of the plastic material comprises coating said part with tetrafluoroethylene.

18. The method set forth in claim 17 wherein said step of coating comprises spraying an uncured resin containing tetrafluoroethylene on said part and thereafter curing said resin.

19. The method set forth in claim 13 wherein said step of providing said surface on one of said parts which does not adhere to plastic comprises coating said part with silicone.

20. The method of making an anti-friction assembly comprising a pair of parts having complementary mating surfaces which engage to provide relative axial and rotative movement between said parts which comprises making one of said parts with a relatively high degree of accuracy, making the mating surface of the other said part with a lesser degree of accuracy providing a space of generally uniform thickness between the mating surfaces of said parts, providing a surface on the mating surface of one of said parts which prevents adhesion of a plastic material thereto, bringing the mating surfaces of said parts into complementary engaging relationship, positioning one of said parts relative to the other so that the space between the mating surfaces is generally divided radially and axially to provide an annular space of generally uniform thickness between the mating surfaces of said parts, injecting a plastic material of the type which will adhere directly to the other of said parts into said space to substantially fill the space between the mating surfaces of said parts, and curing said plastic material to provide a permanent film coating on said other said part.

21. The method of making an anti-friction assembly comprising a nut and a screw which method comprises forming a thread on said screw, forming a thread in said nut with a degree of dimensional accuracy less than the degree of dimensional accuracy of said screw, providing a surface on said screw which will prevent adhesion of a plastic material thereto which will adhere to the nut, threading said screw into said nut, positioning said nut relative to said screw so that the space between the mating threads is generally divided radially and axially to provide an annular space of generally uniform thickness between the threads, injecting a plastic material of the type which will adhere directly to the threads of said nut and substantially filling the space between the threads of said nut and the threads of said screw, and curing said plastic material to form a thin film coating bonded to the threads of said nut.

22. An apparatus for making an anti-friction assembly comprising a nut having internal threads, a screw having external threads, and a plastic material adhered to the threads of one of said nut and said screw and filling the space between the threads of said nut and said screw, which apparatus comprises means for positioning said nut axially and radially relative to said screw and means through which plastic material may be injected into the space between the threads of said nut and said screw.

23. An apparatus for making an anti-friction assembly comprising a nut having internal threads, a screw having external threads, and a plastic material adhered to the threads of one of said nut and said screw and filling the space between the threads of said nut and said screw, which apparatus comprises a sleeve having an opening therethrough through which one end of said screw extends, a second sleeve having an opening through which the other end of said screw extends, means on said sleeve engaging one end of said nut and means on said other sleeve engaging the other end of said nut thereby positioning said nut axially relative to said screw and means on each said sleeve engaging said nut and positioning said nut radially relative to said sleeve.

24. The combination set forth in claim 23 including means through which a plastic material may be injected into the space between the threads of said nut and the threads of said screw.

25. The combination set forth in claim 23 wherein each said sleeve is provided with a relief passage for the plastic material.

26. An apparatus for making an anti-friction assembly comprising a nut having internal threads, a screw having external threads, and a plastic material adhered to the threads of one of said nut and said screw and filling the space between the threads of said nut and said screw, which apparatus comprises a sleeve having an opening into which one end of said screw extends, a second sleeve having an opening into which the other end of said screw extends, each said sleeve having a shoulder surrounding said opening and adapted to engage an end of said nut to thereby axially and radially position said nut relative to said sleeve, and means for locking each said sleeve on said screw.

27. The combination set forth in claim 26 including a radial opening in said nut through which plastic material injected into the space between the threads of said nut and said screw.

28. The combination set forth in claim 26 wherein each said sleeve is provided with axially and radially extending slots providing a relief passage for the plastic material.

29. An anti-friction assembly comprising a nut having internal threads therein, a screw having external threads thereon threaded into and closely mating the threads of said nut, the dimensional accuracy of one of said nut and screw being greater than the dimensional accuracy of the other of said nut and screw providing a space between the threads, a film coating of substantially homogeneous plastic material adhered directly to said one of said nut and screw which has a lesser dimensional accuracy and formed in situ to substantially fill the space between said threads, and a thin film coating of a release agent which prevents adhesion of said plastic material on the other of said nut and screw, said plastic material having a bearing material uniformly distributed therethrough, thereby providing a low friction bearing surface with the thread of the other of said nut and screw.

30. The combination set forth in claim 1 wherein the space between said first member and said second member ranges between approximately 20 and 40 thousandths of an inch.

31. The combination set forth in claim 7 wherein the space between said first member and said second member ranges between 20 and 40 thousandths of an inch.

32. The combination set forth in claim 9 wherein the space between the threads on said nut and the threads on said screw ranges between approximately 20 and 40 thousandths of an inch.

33. The combination set forth in claim 10 wherein the space between the threads on said nut and the threads on said screw ranges between approximately 20 and 40 thousandths of an inch.

34. The combination set forth in claim 29 wherein the space between the threads of said nut and the threads of said screw ranges between approximately 20 and 40 thousandths of an inch.

References Cited in the file of this patent

UNITED STATES PATENTS 1,497,952    Smith  ---------------- June 17, 1924

(Other references on following page)

UNITED STATES PATENTS

| | | | |
|---|---|---|---|
| 1,946,619 | Furman et al. | Feb. 13, | 1934 |
| 2,441,580 | Mageoch | May 18, | 1948 |
| 2,459,598 | Stott | Jan. 18, | 1949 |
| 2,666,677 | Miller | Jan. 19, | 1954 |
| 2,757,051 | Wilmer et al. | July 31, | 1956 |
| 2,766,054 | Everhart | Oct. 9, | 1956 |
| 2,777,783 | Welch | Jan. 15, | 1957 |
| 2,885,248 | White | May 5, | 1959 |
| 2,906,567 | Runton et al. | Sept. 29, | 1959 |
| 2,916,226 | McGraw | Dec. 8, | 1959 |
| 2,972,947 | Fitzsimmons | Feb. 28, | 1961 |

FOREIGN PATENTS

| | | | |
|---|---|---|---|
| 707,066 | Great Britain | Apr. 14, | 1954 |
| 729,351 | Great Britain | May 4, | 1955 |
| 1,181,482 | France | Jan. 12, | 1959 |

OTHER REFERENCES

Publication, "Designing Fabricated Nylon Parts"; Machine Design, March 1954, pages 153–159.